(12) United States Patent
Weir

(10) Patent No.: US 9,250,015 B2
(45) Date of Patent: Feb. 2, 2016

(54) SOLAR-POWERED DRYING, HEATING AND AIR-CONDITIONING SYSTEM

(75) Inventor: Gregory Weir, Boronia (AU)

(73) Assignee: SOLARKILNS PTY LTD, Victoria (AU)

( * ) Notice: Subject to any disclaimer, the term of this patent is extended or adjusted under 35 U.S.C. 154(b) by 380 days.

(21) Appl. No.: 13/700,043

(22) PCT Filed: May 25, 2011

(86) PCT No.: PCT/AU2011/000635
§ 371 (c)(1),
(2), (4) Date: Feb. 1, 2013

(87) PCT Pub. No.: WO2011/146993
PCT Pub. Date: Dec. 1, 2011

(65) Prior Publication Data
US 2015/0020408 A1    Jan. 22, 2015

(30) Foreign Application Priority Data

May 25, 2010    (AU) .................................. 2010902290

(51) Int. Cl.
*F26B 3/00* (2006.01)
*F26B 3/28* (2006.01)
(Continued)

(52) U.S. Cl.
CPC .................. *F26B 3/283* (2013.01); *F26B 3/286* (2013.01); *F26B 21/02* (2013.01); *F26B 21/028* (2013.01);
(Continued)

(58) Field of Classification Search
CPC ............ F26B 3/00; F26B 3/283; F26B 21/00; F26B 21/028; F25B 25/00; F25B 29/00; F25B 27/00

USPC ...................... 34/522, 557, 93, 201; 126/647; 110/315; 62/173, 175, 176.1, 324.3; 165/49, 56
See application file for complete search history.

(56) References Cited

U.S. PATENT DOCUMENTS 4,069,593 A    1/1978    Huang
4,169,459 A *  10/1979   Ehrlich ................. F24J 2/0483
                                                         126/647
(Continued)

FOREIGN PATENT DOCUMENTS

DE    29712734    *  9/1997
GB    2441827     *  3/2008
(Continued)

OTHER PUBLICATIONS

International Search Report for PCT/AU2011/000635, Completed by the Australian Patent Office on Jun. 17, 2011, 5 Pages.

*Primary Examiner* — Stephen M Gravini
(74) *Attorney, Agent, or Firm* — Brooks Kushman P.C.

(57) ABSTRACT

A system for drying or heating product using solar energy including an enclosure defining a kiln chamber in which a charge of the product is placed, the enclosure having at each side of the chamber at least one passage through which air from the kiln chamber can pass to be heated by solar energy impinging on the enclosure, and an air flow system having at least one fan for generating a circulating air flow within the kiln chamber whereby air passes from one side of the charge to the other, and an air supply for drawing air into each passage from the bottom part of the kiln chamber at opposite sides of the charge to move through the passage into an upper portion thereof for discharge into an upper part of the kiln chamber through one or more outlets leading into the upper part of the kiln chamber.

14 Claims, 1 Drawing Sheet

(51) Int. Cl.
 *F26B 21/02* (2006.01)
 *F26B 21/12* (2006.01)
 *F26B 25/14* (2006.01)
 *F24J 2/42* (2006.01)

(52) U.S. Cl.
 CPC ............... *F26B 21/12* (2013.01); *F26B 25/14* (2013.01); *F24J 2/42* (2013.01); *F26B 2200/18* (2013.01); *F26B 2210/16* (2013.01); *Y02B 40/74* (2013.01)

(56) References Cited

U.S. PATENT DOCUMENTS

| | | | | |
|---|---|---|---|---|
| 4,432,147 | A | * | 2/1984 | Chen ............... F26B 3/286 34/542 |
| 5,325,604 | A | | 7/1994 | Little |
| 5,557,859 | A | * | 9/1996 | Baron ............... F26B 3/286 34/102 |
| 5,915,811 | A | * | 6/1999 | DeVore ............... F26B 3/286 34/212 |
| 6,185,835 | B1 | * | 2/2001 | Enbom ............... D06F 73/02 34/105 |
| 6,209,223 | B1 | * | 4/2001 | Dinh ............... F26B 17/1416 34/167 |
| 6,954,994 | B1 | * | 10/2005 | Teo ............... F26B 13/10 34/216 |
| 7,963,048 | B2 | * | 6/2011 | Pollard ............... F26B 15/12 110/315 |
| 8,256,135 | B2 | * | 9/2012 | Hedman ............... A01M 1/2094 34/381 |
| 2007/0256318 | A1 | | 11/2007 | Sugawara et al. |
| 2009/0113752 | A1 | | 5/2009 | Weir |
| 2015/0020408 | A1 | * | 1/2015 | Weir ............... F26B 3/286 34/522 |

FOREIGN PATENT DOCUMENTS

| | | | | |
|---|---|---|---|---|
| IN | WO 2012156768 | A1 * | 11/2012 | ............ F26B 3/286 |
| JP | 2003245906 | | 9/2003 | |
| JP | 2007215514 | * | 8/2007 | |
| WO | 2006053392 | | 5/2006 | |
| WO | 2007035995 | | 4/2007 | |

* cited by examiner

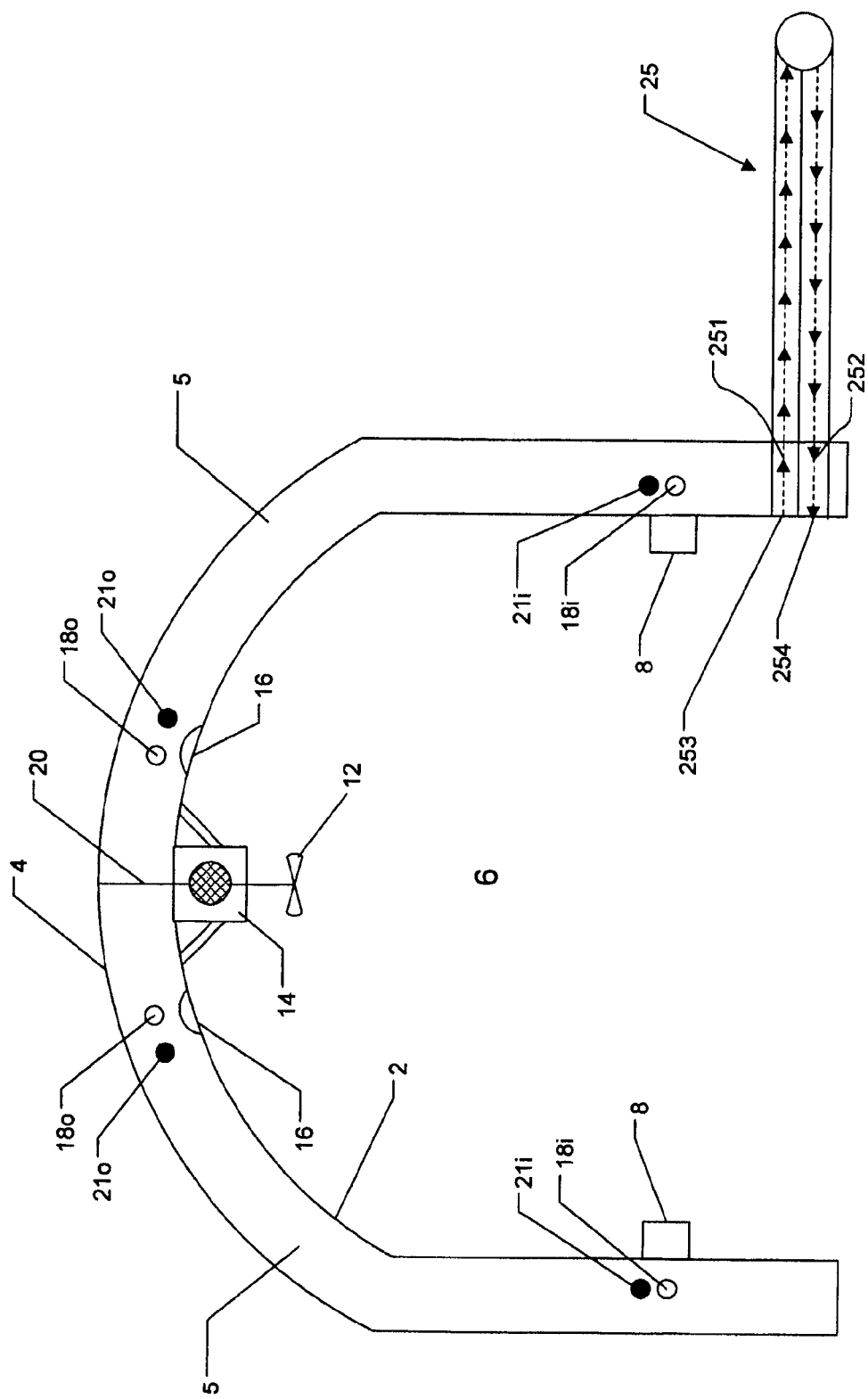

SOLAR-POWERED DRYING, HEATING AND AIR-CONDITIONING SYSTEM

CROSS-REFERENCE TO RELATED APPLICATION

This application is the U.S. national phase of PCT Appln. No. PCT/AU2011/000635 filed on May 25, 2011, which claims priority to Australian Patent Application No. 2010902290 filed on May 25, 2010, the disclosures of which are incorporated in their entirety by reference herein.

The present invention relates to a system for drying or heating product within an enclosure using air heated by solar radiation, and more particularly to a kiln for drying a charge of timber (lumber) or other product such as slurry waste, plant matter, fruit or vegetables, a so-called solar kiln.

In the present specification, the terms "timber" or "lumber" will be used interchangeably and will be understood to refer to wood that has been sawn. The timber/lumber may be in various forms including planks or poles/posts. Further, the term "solar kiln" may include kilns that incorporate supplementary heating systems or external collectors.

In our prior International patent application PCT/AU2005/001756 (WO 2006/053392), the disclosure of which is hereby incorporated by reference, we propose a solar kiln in which the kiln wall is formed by spaced inner, intermediate, and outer layers. Kiln air is directed through a passage defined between the inner and intermediate layers to be heated by solar radiation and is then fed back into the drying chamber within the kiln, and air in the space between the intermediate and outer layers acts as an insulation layer.

In the kiln proposed in this earlier application, kiln air to be heated is drawn from the bottom part of the kiln chamber at one side of the charge of timber into the passage between the inner and intermediate layers of the kiln wall, and is discharged when heated after passage around the kiln wall into the bottom part of the kiln chamber at the opposite side of the charge for mixing with air circulated within the kiln chamber and passing from one side of the charge to the other. In order to expose the charge to more uniform drying conditions, our earlier application proposes that the direction of drying air flow circulating within the kiln chamber is repeatedly reversed. When the flow direction is reversed, the flow direction of the air to be heated by passage between the inner and intermediate layers is also reversed, so that the air to be heated will always be taken from the cooler or downstream side of the charge as considered in the instantaneous direction of the air flow within the kiln chamber. While this overall scheme of operation is sound in principle, it has proven difficult to implement in a manner which is economically viable for a wide range of kiln sizes. Moreover, in order to engender the flow of kiln air through the passage within the kiln wall from the bottom of the kiln chamber at one side to the bottom of the kiln chamber at the other side of the charge, powerful fans are necessary to achieve the required air flow through the passage in the kiln wall, particularly as the flow within the downstream part of the passage for discharge into the bottom of the kiln chamber will be in a downwards direction acting in opposition to the natural tendency of heated air to rise; the fans needed for this have significant energy consumption.

According to the present invention there is provided a system for drying or heating product using solar energy comprising an enclosure defining a chamber in which a charge of the product is placed, the enclosure having at each side of the chamber at least one passage through which air from the kiln chamber can pass to be heated by solar energy impinging on the enclosure, and an air flow system comprising at least one fan for generating a circulating air flow within the chamber whereby air passes from one side of the charge to the other, and air supply means for drawing air into each passage from the bottom part of the chamber at opposite sides of the charge to move through the passage into an upper portion thereof for discharge into an upper part of the kiln chamber through one or more outlets leading into the upper part of the chamber.

In some industries, processes for moisture reduction are called "de-watering" processes and this will be understood to be synonymous with "drying" where the context demands it.

In preferred embodiments of the invention each passage is defined between adjacent layers forming the wall of the enclosure in a manner corresponding to that described in our earlier application.

The air supply means for drawing air into each passage comprises one or more bottom fans associated with the passage. Although in one simple embodiment of the invention the two passages merge at their upper ends to form a single continuous passage it is particularly advantageous for the two passages to be separate whereby the bottom fans associated with the respective passages can be separately controlled to permit differential air flow through the two passages or air flow through just a single one of the passages; this control of the air flow can be subject to a range of different factors which govern the solar heating efficiency and function.

In another aspect, the present invention provides an external collector for a kiln having a kiln chamber, the external collector including a collector inlet to receive input air from the kiln chamber and a collector outlet to transmit output air to the kiln chamber; the external collector further including at least one inlet sensor and at least one outlet sensor to measure one or more characteristics of the input air and output air respectively; wherein a control system associated with the external collector opens or closes the collector inlet or the collector outlet in response to said measured characteristics.

Preferably, one of said measured characteristics is absolute humidity. In this embodiment, the collector inlet is opened when the absolute humidity at the collector inlet is greater than the absolute humidity at the collector outlet, and closed when the absolute humidity at the collector inlet is less than or equal to the absolute humidity at the collector outlet. The external collector thereby acts as an automated dehumidifier for the kiln, rather than having the kiln vent to the atmosphere.

In another embodiment, one of said measured characteristics is temperature, and the collector inlet is opened when the temperature at the collector inlet is greater than the temperature at the collector outlet, and closed when the temperature at the collector inlet is less than or equal to the temperature at the collector outlet. Thus, for example, the external collector can act as a cooler when the collector control system detects that air in the collector is colder than air inside the kiln chamber.

In yet another embodiment, said measured characteristics may include both temperature and absolute humidity. The collector inlet is then opened when the absolute humidity at the collector inlet is greater than the absolute humidity at the collector outlet and the temperature at the collector inlet is greater than the temperature at the collector outlet. The collector inlet is closed when the absolute humidity at the collector inlet is less than or equal to the absolute humidity of the collector outlet and the temperature at the collector inlet is less than or equal to the temperature at the collector outlet. In this mode, the collector simultaneously acts as both a cooler and dehumidifier.

The system according to the first aspect of the invention may include one or more external collectors according to the second aspect of the invention.

In a further aspect of the present invention, there is provided a method of drying or heating product using solar energy, comprising:

provides an enclosure defining a kiln chamber, the enclosure having at each side of the chamber at least one passage through which air from the kiln chamber can pass to be heated by solar energy impinging on the enclosure;

placing a charge of the product in the kiln chamber;

generating a circulating air flow within the kiln chamber whereby air passes from one side of the charge to the other; and drawing air into each passage from the bottom part of the kiln chamber at opposite sides of the charge;

whereby air moves through the passage into an upper portion thereof for discharge into an upper part of the kiln chamber through one or more outlets leading into the upper part of the kiln chamber.

Embodiments of the invention will now be described by way of example only with reference to the accompanying drawing which shows highly schematically a section through the kiln wall of a solar kiln in accordance with one preferred embodiment.

The kiln in accordance with preferred embodiments of the invention is of substantially the same general construction as that disclosed in our earlier application in which the kiln wall which forms an enclosure consists of inner and outer layers with an intermediate layer there between, with an air passage being defined between the inner and intermediate layers, and air between the intermediate and outer layers acting as a permanent insulation barrier. Reference may be made to our earlier application for an understanding of the detailed structure of the kiln and possible variants thereof. It is to be noted that although in a preferred embodiment the kiln wall is constructed from layers of flexible plastics sheeting, the all could be constructed from rigid or semi-rigid plastics material or even non-plastics material such as steel sheeting of the type used for roofing and preferably coloured to improve absorption of solar radiation. Although a particularly preferred usage of the kiln is the drying of a charge of timber, it can also be used for a variety of other drying, heating and/or air-conditioning functions as will be described.

The substantive difference of the present invention over our earlier kiln concerns the air flow system for the air to be heated by passage within the kiln wall between the inner and intermediate layers and this will be described with reference to FIG. 1 which shows the system highly schematically. It is to be noted that this FIGURE just shows the inner and intermediate layers 2, 4 of the kiln wall, and the outer layer which acts in conjunction with the intermediate layer to provide a substantive insulation effect, although present, has been omitted from FIG. 1. A passage 5 for kiln air to be heated by solar radiation is defined within the wall between the layers 2, 4.

The air flow system comprises at each side of the kiln chamber 6 at the bottom thereof, inlet manifolds and associated fans 8 to draw kiln air from the bottom of the kiln chamber at that side to flow upwardly through the passage 5 for discharge of the heated air from the upper part of the passage 5 into the upper part of the kiln chamber 6 in the zone of action of a main circulation fan 12 for the air within the kiln chamber. The air flowing through the passage 5 from each side of the kiln can feed into a common outlet manifold 14 in the upper part of the kiln or alternatively each side may discharge into the upper part of the kiln via separate outlets 16. If a series of separate outlets 16 is used, these can be associated with further outlet fans which, when operated, will act in opposition to the bottom fans drawing kiln air into the passage 5 to retard or stall the air flow within the passages from its lower portion to thereby provide a substantive insulation effect when solar heat is not available. The control for effecting this insulation mode can be relatively straightforward and may consist of a simple light sensor and/or timer.

Temperature sensors $18i$, $18o$ may be incorporated to measure the air temperature within inlet and outlet zones of the passage 5. The difference in the respective temperatures at the inlet $18i$ and outlet $18o$ sensors is used to determine whether air passing through the passage 5 from the kiln chamber 6 is being heated or cooled. This data is used by a kiln controller to determine whether to change function from collector (heating) mode to insulation mode. Alternatively a passage outlet temperature sensor can be mounted within the outlet manifold 14 to provide a measurement of the outlet temperature, and a close approximation of the inlet air temperature can be obtained using temperature sensors located within the kiln chamber 6 (not shown). The difference between the outlet temperature at the manifold 14 and the approximate inlet temperature can similarly be used to instruct the kiln controller to switch between heating mode and insulation mode.

The system in its basic form continuously operates passage inlet fan(s) 8 to draw air into the passage 5 from the bottom of the kiln chamber at both sides thereof for discharge of the heated air from the passage into the upper part of the kiln chamber by way of discharge points (outlets) 14 and/or 16 as described above. The main circulation fan 12 is reversible and is periodically reversed to change the direction of air flow circulation within the kiln chamber 6 to expose the charge to more uniform drying conditions. In its basic form as described thus far, irrespective of the direction of circulation air for heating is drawn into the passage 5 from the bottom of the kiln at both sides of the charge and then discharged through one discharge point 14 or through multiple discharge points 16 located on both sides of the kiln. While this can provide quite satisfactory results, improved control and efficiency of the heating effect can be obtained in relatively straightforward manner as will now be described.

To achieve the improvements in control and efficiency, the opposite sides of the passage 5 within the kiln wall may be separated by a central barrier 20 to thereby form two separate passages which enables the flow of air at one side of the kiln chamber 6 to be operated separately from, and independently of, the flow of air at the other side. This enables a range of different control functions to be independently and simultaneously applied to either side passage 5. For example, by activating just the inlet fan(s) at the cooler side of the charge as considered in relation to the direction of air circulation at that time, just the cooler air can be withdrawn from the bottom of the kiln for heating—an action corresponding to that of our previously proposed kiln but achieved in a significantly simpler way In another example, if one side of the kiln wall is directly exposed to sunlight whereas the opposite side is in shade, then just the outlet fan(s) associated with outlet 16 at the shady side of the kiln may be actuated to insulate that side. The outlet fan(s) associated with outlet 16 on the sunny side, or manifold 14, may remain deactivated so that air can flow through the passage 5 from the lower inlet fan on the sunny side. The sunny side therefore acts in collector (heating) mode while the shady side is operating in insulator mode.

If, as is particularly preferred, the bottom fans are multi-speed fans, the fans at the two sides of the kiln can be differentially controlled in accordance with a range of parameters so as to optimise the heat exchange effects in the two parts of the wall.

In a particularly preferred embodiment, the speed of the fans 8 is controlled according to the change in temperature and/or change in humidity of air passing through the kiln passage 5. A kiln controller (not shown) may be programmed to receive measurements from humidity sensors 21i located at the lower inlet points and humidity sensors 21o located at the upper outlet points. Similarly, temperature inlet (lower) sensors 18i and outlet (upper) sensors 18o can be used to measure temperature changes. The differences between inlet and outlet temperature and/or humidity can be compared to the desired (predetermined) temperature and humidity differences as determined by the kiln operator. If the measured parameters are different to the desired parameters, the kiln controller automatically adjusts the speed of the fans 8 up or down until the desired temperature and/or humidity differentials are reached. A kiln controller suitable for this purpose, and its method of operation, are described in our earlier International application PCT/AU2006/001424 (WO 2007/035995), the contents of which are hereby incorporated by reference.

It will of course be appreciated that any number of other user-determined parameters may be used as a basis upon which the fan speed and air flow may be adjusted, and these may include the intensity of sunlight, the angulation of the sun, and the direction of circulation of the air within the kiln chamber 6 as provided by the main fan 12.

Adjusting the speed of the fans 8 in response to the measured temperature improves exchange efficiency by reducing peak radiation losses when solar radiation and energy is high and the measured inlet-outlet temperature differential indicates that the current conditions are not conducive to optimal heat exchange. Varying air flow from the lower inlet fans 8 in order to maintain consistent inlet-outlet temperature differential provides improved heat exchange or transmission of solar energy to the process and thereby adds greatly to solar heating efficiency. Additionally, optionally varying air flow in response to measured inlet-outlet humidity differential may allow the desired process humidity level to be reached more efficiently.

The humidity sensors 21i, 21o act as extra 'air conditioning' elements for cooling or dehumidification, and may be installed at similar lower inlet and upper outlet locations to the temperature sensors 18i, 18o.

Using the humidity sensors 21i, 21o and temperature sensors 18i, 18o, the kiln controller will decide (for example, by any one of the methods described in our earlier application PCT/AU2006/001424) when to over-ride the inner cavity insulation mode to facilitate dehumidification (by condensing action). The cooling effect caused by the condensing action allows the system to ensure best energy targeting for material that overdries or degrades when consuming energy at the expense of portions of the drying mass that dry more slowly and most need the limited available energy during, for example, the dark night-time period. This is important because it allows the system to vary both absolute humidity and temperature in the kiln chamber 6 as a means of better targeting thermal energy to portions that most require it.

Dehumidification provides an efficient system for managing the extent, timing and rate of cooling of the kiln chamber 6 and these cooling parameters can be chosen to suit the nature and characteristics of the material being dried and its desired final moisture content.

In one preferred embodiment, one or more external collectors 25 may be employed in conjunction with the main kiln passage 5 in order to assist in simultaneous control of temperature and humidity within the kiln chamber 6. Each external collector 25 may have features that enhance its applications including solar collector and/or air cooler and dehumidifier ("Air conditioning functions") and may optionally provide water collection functions.

External collector 25 is an additional envelope attached to the main kiln chamber 6 that permits the surface area available for solar collection and air heating, and/or condensation purposes, to be varied when desired. The external collector 25 has a collector inlet 253 to admit air from the main kiln chamber 6 and a collector outlet 254 to return air to the main kiln chamber 6. The inlet 253 and outlet 254 are separately openable and closable, possibly manually, but preferably by a collector control system in response to measurements of temperature and/or absolute humidity as will be described below.

The external collector 25 may have similar thermal skin attributes to the main kiln, namely an inner, intermediate and outer layer (the outer layer providing insulation properties). Alternatively, they may comprise two layers only (an inner absorbing layer and an outer layer). The external collector 25 is connected directly to the kiln by means of ducts or fixtures 251 through which kiln air is fed from collector inlet 253, preferably from the lower part of the kiln chamber 6, and returned via ducts or direct connections 252 to the kiln chamber 6 via collector outlet 254. It is thought that a two-layer plastic film structure provides 5-7% greater solar collection efficiency per unit area than a three-layer structure and that a three-layer structure has 30% greater insulation properties than a two-layer structure. Consequently we have found that a two-layer design may be deployed in one or more additional collector units 25 as specialised condensing or dehumidification and cooling systems separate and complementary to main passage 5 when there is a particular need for additional cooling and/or energy targeting.

The collectors 25 may operate in conjunction with a simple gravity fed water collection system to collect water created from condensation (and deposited on an internal surface of the collector 25) during the dehumidification process described above.

A system including external collectors 25 may thus be used for cost effective separation and re-capture of water from drying processes generally, at the same time as improving the efficiency of all types of kilns, including conventional, non-solar powered kilns.

External collectors 25 may be controlled by the main kiln controller, or may be controlled by a separate collector control system which may or may not communicate with the main kiln controller. The collector control system may be used to automatically switch the collector or collectors between different modes of operation, including but not limited to the following:

Dehumidifier: humidity sensors at the collector inlet and collector outlet measure the absolute humidity of air leaving and entering the kiln chamber from the collector. These measurements are communicated to the collector control system. If the absolute humidity of air inside the kiln chamber is greater than that inside the collector, the collector control system fully opens the collector inlet 253 and the collector outlet 254 so that the more humid air from the kiln chamber 6 can be removed and replaced with drier air from the collector.

Cooler: temperature sensors measure the temperature of air at the collector inlet 253 and the collector outlet 254 respectively. If the air entering the collector is hotter than that inside the collector, the collector control system fully opens the collector inlet 253 and collector outlet 254 to allow the hotter air from the kiln chamber 6 to be replaced by cooler air from the collector.

Cooler and Dehumidifier: measurements of both absolute humidity and temperature are used by the collector control system to operate the inlet 253 and outlet 254. If the air inside the kiln chamber 6 is hotter and more humid than that inside the collector, the collector control system fully opens the collector inlet and the collector outlet so that the hotter humid air from the kiln chamber can be replaced by cooler drier air from the collector.

The external collectors 25 may thus be used as additional envelopes by selectively recirculating air to heat, cool or to remove airborne water by condensation from the main kiln chamber 6. When sunlight or another source of heat is not available, the kiln controller turns on the power for the upper stall fans associated with outlets 14, 16 to change to insulation mode. External collectors 25 can be simply connected electrically to the same control signal from the kiln controller by reverse relays so as to turn off when the upper stall fans turn on. When extra heat is called for the collectors 25 will then deflate and de-activate until the sensors 18 detect that solar energy heat is again available so that they may be re-activated.

Although the collector inlet 253 and collector outlet 254 are described in the foregoing discussion as "open" or "closed", it will be appreciated that for practical purposes, the collector inlet and outlet will generally be at least partially open, if only to a slight degree, to allow a small amount of air to pass between the kiln chamber 6 and the collector 25 so that the differences in temperature and absolute humidity between the kiln chamber and the external collector can be measured by the temperature and humidity sensors as described above.

External collectors provide an opportunity to take advantage of the usually detrimental, but by embodiments of our invention positively enabled, aspects of natural energy cycles, for example by also using collector 25 as an optional dehumidifier at night. This night time action has been found to improve efficiency of dehumidification when for example the outside air is naturally very cold. In known systems, excess humidity levels in the chamber 6 are reduced by exhausting saturated air direct to external atmosphere. When this is done, the exhausted air is replaced directly from ambient conditions outside the process and this wastes heat energy and may also, under during periods of fog or rainfall, introduce additional unwanted moisture.

By contrast, our system can pass excessively humid air from chamber 6 into collector 25 and then return the dehumidified air to the process whilst still retaining some of its heat energy. We have found this to be particularly useful and effective for solar drying systems that rely on finite latent or accumulated heat at night. Our invention of alternative parallel venting/external conditioner systems is also believed to offer advantages for retention of dehumidified process air compared to direct external discharge systems as known in the art and may in some instances reduce harmful, odorous or undesirable emission and exhaust gases or particles from the process which would otherwise be released to the atmosphere.

The use of external collectors 25 also provides at least some of the following advantages:

Additional heat for the kiln further reducing the need for external energy sources for heat.

Enhanced capacity to influence the extent, timing and rate of change of the drying elements—heating, cooling and humidity control—that facilitate drying and promote targeting of thermal energy.

A reduction in the size and height of the main kiln chamber 6, which is beneficial for more effective drying of certain materials particularly those that cannot practically be stacked to height such as slurry waste, woody biomass and grain. The external collectors 25 at least partially counteract the loss of surface area presented by a smaller main kiln chamber 6 by offering more surface area to heat and to capture more energy for use. However, because they are separate elements they can be controlled using the temperature differential system described above to turn off the air supply and deflate until required next time.

Greater efficiency as a cooler-dehumidifier because it may be designed with a colder exposed inner clear surface that serves to act better as a condenser/cooler when air is less saturated in the kiln passage 5. This provides scope for the control system to maximise air conditions for energy targeting. Energy targeting produces more evenly dried products and better manages energy consumption.

Being physically separate from the kiln chamber 6 and passage 5, they may be uninsulated or controlled separately and independently in function to the main passage 5 to achieve functions independent of other collector units as required.

The system particularly described avoids the difficulties present in our previously proposed system arising from the switching of the air flow direction through the passage within the kiln wall. Moreover because the air flow direction through the passage from each side of the kiln chamber is always in an upwards direction from the bottom of the wall to the upper part of the wall, smaller fans with less energy consumption are sufficient. Also the system avoids the adverse affect that air heated when passing through one part of the passage in the wall may be subject to heat loss when passing through the opposite part of the passage in a section of the wall in a shaded, or wind chill affected, zone.

The embodiments have been described by way of example only and modifications are possible within the scope of the invention. In particular, although the kiln described herein is particularly suitable for drying a charge of timber it could be used for drying a variety of other products, not limited to but including: slurry or human waste; pulp; biomass; wood chips, food and herbs; feed and pellets. It may alternatively be used as a heated enclosure for growing a variety of crops such as vegetables or herbs or seedlings. Moreover, although in the preferred embodiment the kiln wall which forms the opposite sides and top of the enclosure is a continuous wall, in an alternative, the kiln wall may be formed by separate sides and a roof. Further, while the fans used for air supply to the passages 5 are described as being associated with inlet manifolds 8, it will be appreciated that they may also be directly affixed to the inner layer 2 of the kiln and that, this may likewise be done for fans associated with outlets 14 and 16.

The claims defining the invention are as follows:

1. An external collector for collecting solar energy for use in drying or heating product in a kiln having a kiln chamber, the external collector being formed of an inner and an outer layer defining an air passage therebetween and including a collector inlet to receive input air from the kiln chamber and a collector outlet to transmit output air to the kiln chamber; the external collector further including at least one inlet sensor and at least one outlet sensor to measure one or more characteristics of the input air and output air respectively; wherein a collector control system associated with the external collector opens or closes the collector inlet or the collector outlet in response to said measured characteristics, wherein one of said measured characteristics is absolute humidity, and wherein the collector inlet is opened when the absolute humidity at the collector inlet is greater than the absolute humidity at the collector outlet, and closed when the absolute humidity at the collector inlet is less than or equal to the absolute humidity at the collector outlet.

2. A system for drying or heating product using solar energy comprising at least two collectors according to claim 1, the collectors being arranged for collection of solar energy and in communication with a kiln chamber in which a charge of the product is placed, the collectors providing at each side of the chamber at least one passage through which air from the kiln chamber can pass to be heated by solar energy impinging on the collectors, and an air flow system comprising at least one fan for generating a circulating air flow within the kiln chamber whereby air passes from one side of the charge to the other, and air supply means for drawing air into each passage from a bottom part of the kiln chamber at opposite sides of the charge to move through the passage into an upper portion thereof for discharge into an upper part of the kiln chamber through one or more outlets leading into the upper part of the kiln chamber.

3. The system according to claim 2, wherein the air supply means for drawing air into each passage comprises one or more fans associated with the passage.

4. The system according to claim 3, wherein the fans are controlled by a kiln controller.

5. The system according to claim 2, wherein the two passages merge at their upper ends to form a single continuous passage.

6. The system according to claim 3, wherein the two passages are separated and the fans associated with the respective passages are separately controllable to permit differential air flow through the two passages or air flow through a single one of the passages.

7. The system according to claim 2, wherein the or each outlet is subject to control by means of an upper fan selectively operable to act in opposition to the air supply means whereby to retard or stall the air flow through the passage and thereby to maintain an insulating layer of air within the passage.

8. The system according to claim 2, wherein the or each fan has a speed which is adjustable by the kiln controller in response to a measurement of at least one kiln parameter.

9. The system according to claim 2, wherein each passage is defined between adjacent layers forming the collectors.

10. The external collector according to claim 1, wherein one of said measured characteristics is temperature, and wherein the collector inlet is opened when the temperature at the collector inlet is less than the temperature at the collector outlet to cool air within the kiln chamber.

11. The system according to claim 8, wherein the kiln controller is configured to continually adjust the fan speed until a predetermined value of the or each kiln parameter is reached.

12. The external collector according to claim 1, wherein the collector inlet and collector outlet are selectively operable.

13. A system for drying or heating product using solar energy comprising at least two collectors according to claim 1, the collectors being arranged for collection of solar energy and in communication with a kiln chamber in which a charge of the product is placed, the collectors providing at each side of the chamber at least one passage through which air from the kiln chamber can pass to be heated by solar energy impinging on the collectors, and an air flow system comprising at least one fan for generating a circulating air flow within the kiln chamber whereby air passes from one side of the charge to the other, and air supply means for drawing air into each passage from a bottom part of the kiln chamber at opposite sides of the charge to move through the passage for discharge into the kiln chamber through one or more outlets.

14. The external collector according to claim 1, wherein one of said measured characteristics is temperature, and wherein the collector inlet is opened when the temperature at the collector inlet is greater than the temperature at the collector outlet, and closed when the temperature at the collector inlet is less than or equal to the temperature at the collector outlet.

* * * * *